Jan. 10, 1928.  1,655,606

J. C. HOLST

DRAG CART

Filed Feb. 19, 1927

Witness
L. F. Sandberg

Inventor
John C. Holst
by Bair & Freeman Attorneys

Patented Jan. 10, 1928.

1,655,606

UNITED STATES PATENT OFFICE.

JOHN C. HOLST, OF EVERLY, IOWA, ASSIGNOR OF ONE-HALF TO L. F. WIESE, OF EVERLY, IOWA.

DRAG CART.

Application filed February 19, 1927. Serial No. 169,500.

The object of my invention is to provide a drag cart of simple, durable and comparatively inexpensive construction.

A further object of my invention is to provide a drag cart which can be secured to a drag or harrow for the purpose of supporting the operator of the harrow and which can be swung to a position following either end of the harrow for the purpose of allowing the operator to ride close to the ground which has been just harrowed so that he can properly gauge the harrow for overlapping it on the last stretch of harrowing which has just been accomplished.

A further object of my invention is to provide a drag cart comprising a frame having steerable wheels thereon and a connection between the frame and the draw bar of a drag or harrow whereby the frame of the cart remains parallel to the draw bar but is capable of movement from position following behind one end of the drag or harrow to a position following the other end of the drag whereby the operator does not have to turn sideways in his seat in order to properly handle the horses pulling the drag or harrow.

Still a further object is to provide a locking means for locking the cart in either of the two positions mentioned in the last object.

Still a further object is to provide for the manual operation of the steering mechanism of the wheels of the cart for the purpose of causing the cart to swing from one of the positions to the other.

Still a further object is to provide locking means for the steering mechanism whereby the wheels are locked in a predetermined position.

Still a further object is to provide a foot pedal or the like for unlocking the steering mechanism and the means for maintaining the harrow cart in either of the two positions behind the drag.

With these and other objects in view, my invention consists in the construction, arrangement and combination of the various parts of my device, whereby the objects contemplated are attained, as hereinafter more fully set forth, pointed out in my claims and illustrated in the accompanying drawings, in which:

Figure 1:
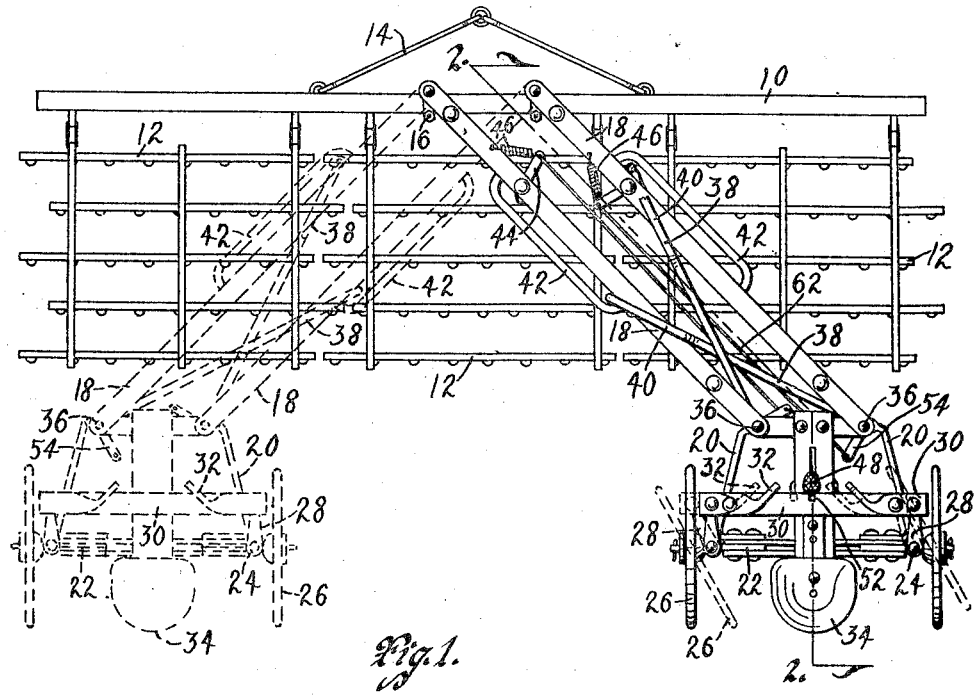
Figure 1 illustrates a plan view of a harrow showing one embodiment of my drag cart operatively connected thereto.

On the accompanying drawings I have used the reference numeral 10 to indicate the draw bar of a harrow having the harrow sections 12. The usual hitch connection 14 is provided on the draw bar 10 to which the horses are hitched. The bar 10 may be considered part of the drag or harrow.

Figure 2:
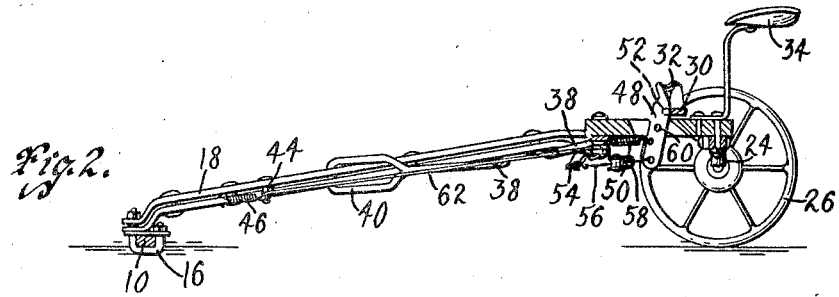
Figure 2 is a sectional view on the line 2—2 of Figure 1.

It will be understood of course, that my device can be secured to a road drag or the like if found desirable. Pivotally secured to the draw bar 10 of the drag or harrow by means of U-bolts 16 is a pair of tongues 18 best shown in Fig. 2 of the drawings. The tongues 18 extend upwardly and rearwardly over the harrow sections 12 and terminate behind them.

The drag cart comprises a frame 20 having an axle member 22. The rear ends of the tongues 18 are pivotally connected to the frame 20 by bolts 36 whereby the draw bar 10, tongues 18 and frame 20 form a parallelogram structure. A pair of vertical spindles 24 are mounted on the axle 22 and have rotatably or swivelly mounted thereon the cart wheels 26. The spindles 24 are provided with arms 28, the free ends of which are connected by a bar 30. Secured to the bar 30 are foot engaging devices 32.

From the foregoing description it will be seen that the wheels 26 may be steered by the operator. This is accomplished by pressing with his foot on either of the foot engaging members 32 for moving the bar 30 laterally relative to the frame 20.

Secured to the center portion of the frame 20 is a seat 34 for supporting the operator.

From the foregoing description it is obvious that the drag cart can be swung from the position shown in Figure 1 to the dotted line position by imparting steering movement to the wheels 26 as indicated in dotted lines. In this manner the cart can be caused to follow either the right hand harrow section 12 or the left hand section 12 as desired.

It is further desirable to lock the cart in either of the two positions just mentioned. I accomplish this by the following construction.

Figure 3:
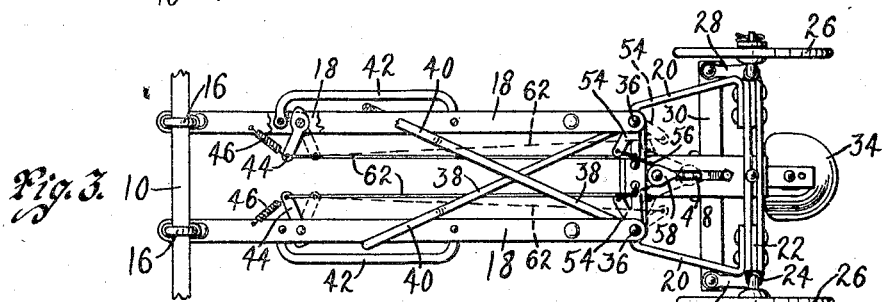
Figure 3 is an inverted plan view of the drag cart.

Pivotally mounted on the bolts 36 are links 38. The links 38 extend forwardly and terminate in loop-like portions 40 which encircle the tongues 18. Guideways are provided for the loop-like portions 40 so that they move in a predetermined path relative to the tongues 18. The guideways are in the form of rods 42 as clearly illustrated in Figures 1 and 3 of the drawing.

It is obvious that as the cart is swung from one position to the other the loop-like portions 40 of the links 38 will slide along the tongues 18 and when locked in any position will prevent pivotal movement of the tongues.

I provide for such locking by pivoting latches 44 on the tongues 18. The latches 44 are spring actuated in one direction by the springs 46 and the links 38 serve to move the latches against the spring tension as they move toward the forward end of the guideways 42.

Another aid in locking the cart device in either of the two positions to which it is swung during its use is a means for locking the steering bar 30. This is accomplished by a foot pedal 48 constrained toward movement in one direction by a spring 50. The foot pedal 48 engages in a notch 52 when the notch registers with the foot pedal.

I also use the foot pedal 48 for the purpose of moving the latches 44 and thereby unlatching the links 38. This is accomplished by bell cranks 54 mounted on the pivot bolts 36 and which are connected through the medium of a chain 56 and pulley 58 to the lower end of the foot pedal 48. The foot pedal 48 is pivoted at 60 on the frame 20. A connecting link 62 extends between each bell crank lever 54 and latch 44.

From the foregoing construction it will be obvious that a pressure forward on the foot pedal 48 will disengage it from the notch 52 for allowing a steering movement of the wheels 26 and such movement will also actuate the pulley 58, chain 56, bell crank levers 54, and links 62 for disengaging the latches 44 from the forward end of the links 38. The operator can then impart steering movement to the wheels for moving the cart to the other side of the harrow and when in such position the foot pedal 48 will reengage the notch 52 in the bar 30 and the latch 44 will engage the link 38 for maintaining the cart in its new position.

A distinguishing advantage lies in the use of the parallel tongues 18. The seat 34 will always remain in the same relation to the harrow so that the operator does not have to turn sideways when driving the horses for turning them at the end of a stretch of harrowing.

The harrow cart is locked in either of its predetermined positions and can readily be unlocked for swinging to the other position when it will automatically be relocked for maintaining it in proper position.

Some changes may be made in the construction and arrangement of the various parts of my invention, without departing from the real spirit and purpose of my invention, and it is my intention to cover by my claims, any modified forms of structure or use of mechanical equivalents, which may be reasonably included within their scope.

I claim as my invention:

1. In combination with a drag or the like, a cart of the character described comprising a frame, steerable wheels thereon, a pair of parallel tongues pivoted at one end to said frame and at the other end to the drag, said drag, said frame and said tongues forming a parallelogram whereby steering movement imparted to said wheels will swing the cart relative to the drag and said cart will be maintained in a position parallel to the drag.

2. In combination with a drag or the like, a cart of the character described comprising a frame, steerable wheels thereon, a pair of parallel tongues pivoted at one end to said frame and at the other end to the drag whereby steering movement imparted to said wheels will swing the cart relative to the drag for causing the cart to follow behind either end of the drag and means for locking the tongues to maintain the cart in position behind either end of the drag, said means comprising links pivoted to said frame and latches on said tongues for engaging said links.

3. In combination with a drag or the like, a cart of the character described comprising a frame, wheels swivelly mounted thereon, a link associated with said wheels to cause them to swivel simultaneously, a pair of parallel tongues pivoted at one end to said frame and at the other end to the drag whereby steering movement imparted to said wheels will swing the cart relative to the drag for causing the cart to follow behind either end of the drag and means for locking the tongues to maintain the cart in position behind either end of the drag.

4. In combination with a drag or the like, a cart of the character described comprising a frame, swivelly mounted wheels thereon, a link associated with said wheels for causing them to swivel simultaneously, a pair of parallel tongues pivoted at one end to said frame and at the other end to the drag whereby steering movement imparted to said wheels will swing the cart relative to the drag and said cart will be maintained in a position parallel to the drag, means for locking said tongues to maintain the cart in a predetermined position relative to the drag and means for therewith simultaneously locking the wheels of the cart against swivel movement.

5. In combination with a drag or the like, a cart of the character described comprising a frame, steering wheels thereon, a tongue structure pivoted at one end to said drag and at the other end to said frame, whereby a parallelogram construction is had to cause alignment of the harrow and the frame in all their relative positions, means for locking the tongue structure at an angle to said drag and said frame whereby said cart may follow behind either end of said drag and a pedal device for locking the steering mechanism of said wheels in a predetermined position.

6. A cart structure of the character described comprising a parallelogram structure including a frame a draw bar and a pair of tongues, manually steerable wheels mounted on said frame, means for locking said wheels against steering movement and means associated therewith for locking the cart at predetermined positions, said last means comprising links adapted to be latched to said tongues for maintaining the tongues at predetermined angles relative to the frame.

7. In combination with a drag or the like, a cart of the character described comprising a frame, steerable wheels thereon, a tongue structure pivoted at one end to said drag and at the other end to said frame, means for locking the tongue structure at an angle relative to said frame whereby said cart may follow behind either end of said drag, a pedal device for locking the steering mechanism of said wheels in a predetermined position, said pedal device being connected to the means for locking the tongue structure whereby the steering mechanism and the tongue structure are both unlocked upon actuation of said pedal.

JOHN C. HOLST.